United States Patent [19]

Neki et al.

[11] Patent Number: 4,516,514
[45] Date of Patent: May 14, 1985

[54] CIRCUIT ARRANGEMENT FOR CONTROLLING SEWING MACHINE SPEED AND FOR POSITIONING SEWING NEEDLE

[75] Inventors: Shigeo Neki; Nozomu Shinozaki; Takeshi Morofuji, all of Osaka, Japan

[73] Assignee: Matsushita Electric Industrial Co., Ltd., Japan

[21] Appl. No.: 535,287

[22] Filed: Sep. 23, 1983

[30] Foreign Application Priority Data

Sep. 25, 1982 [JP] Japan .................................. 57-166923
Sep. 25, 1982 [JP] Japan .................................. 57-166926
Sep. 25, 1982 [JP] Japan .................................. 57-166927

[51] Int. Cl.³ ............................................. D05B 69/26
[52] U.S. Cl. .................................... 112/275; 318/369
[58] Field of Search .................... 112/275, 277, 67, 87; 318/369, 269, 270, 371, 375

[56] References Cited

U.S. PATENT DOCUMENTS

| | | | |
|---|---|---|---|
| 3,761,790 | 9/1973 | Daab | 112/275 X |
| 3,872,365 | 3/1975 | Vignaud et al. | 318/369 X |
| 4,137,860 | 2/1979 | Yoneji et al. | 112/275 X |
| 4,377,778 | 3/1983 | Neki et al. | 318/341 |

FOREIGN PATENT DOCUMENTS 54-150243 11/1979 Japan .

Primary Examiner—Peter Nerbun
Attorney, Agent, or Firm—Lowe, King, Price & Becker

[57] ABSTRACT

The circuit arrangement comprises a speed control system responsive to a speed signal indicative of the rotational speed of an arm shaft driving the sewing needle in the same manner as in known arrangements. Although the circuit arrangement operates in the same manner as in the known arrangement when a foot pedal is other than a neutral position, once the foot pedal is released to be in the neutral position, particularly provided speed setting data is used where the speed setting data value decreases as the rotational angle of the arm shaft increases. With this arrangement the sewing machine is capable of operating at a speed higher than conventional one during needle positioning with the speed being sufficiently reduced just before the needle is stopped. Thus a time length required for the last stitch has been remarkably reduced, providing efficient sewing work without deteriorating positioning accuracy. The sewing machine speed damping curve slope may be manually selected so that a user can set a desired positioning time. Furthermore, by selecting a needle position signal, the needle may be stopped at either at an uppermost position or a lowermost position.

12 Claims, 16 Drawing Figures

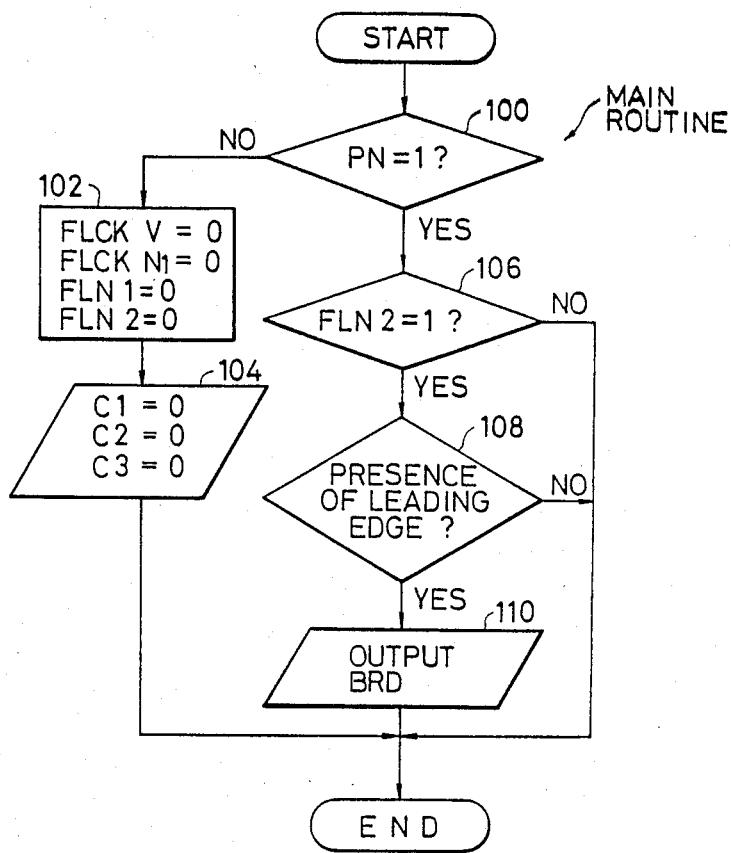

INTERRUPT SERVICE ROUTINE

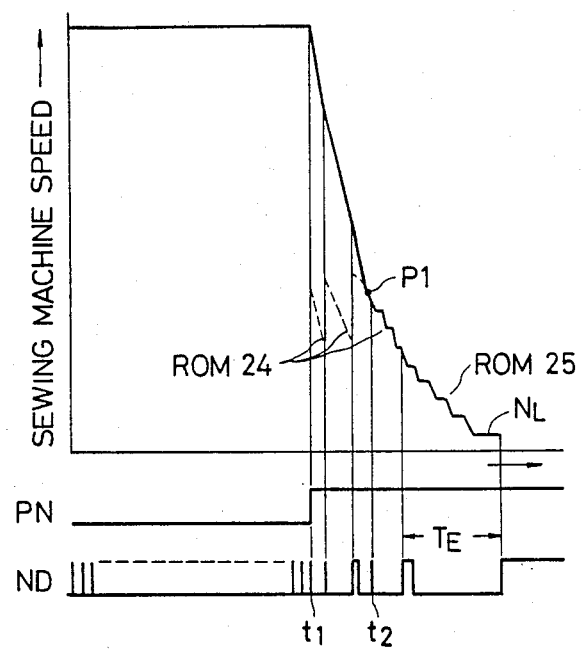

FIG. 10

| ADDRESS | | | | DATA | | | |
|---|---|---|---|---|---|---|---|
| BIT "3" | BIT "2" | BIT "1" | BIT "0" | ROM 23 | ROM 24 | ROM 25 | |
| L | L | L | L | 6 | 9 | 4 | SWITCH 33 IS ON |
| L | L | L | H | 5 | 8 | 3 | |
| L | L | H | L | 4 | 7 | 2 | |
| L | L | H | H | 3 | 6 | 1 | |
| L | H | L | L | 2 | 5 | 0 | |
| L | H | L | H | 2 | 5 | 0 | |
| L | H | H | L | X | X | X | |
| L | H | H | H | X | X | X | |
| H | L | L | L | 5 | 7 | 3 | SWITCH 33 IS OFF |
| H | L | L | H | 4 | 6 | 2 | |
| H | L | H | L | 3 | 5 | 1 | |
| H | L | H | H | 2 | 4 | 0 | |
| H | H | L | L | 2 | 4 | 0 | |
| H | H | L | H | 2 | 4 | 0 | |
| H | H | H | L | X | X | X | |
| H | H | H | H | X | X | X | |

X : UNUSED

CIRCUIT ARRANGEMENT FOR CONTROLLING SEWING MACHINE SPEED AND FOR POSITIONING SEWING NEEDLE

BACKGROUND OF THE INVENTION

This invention relates generally to a circuit arrangement for controlling the operation of a sewing machine, and particularly the present invention relates to needle positioning in a sewing machine.

The needle of a sewing machine is arranged to be driven by an electrical motor to be periodically moved up and down, and is further arranged to be stopped at a predetetmined position when a foot pedal used for controlling the driving speed of the needle is put in neutral position. In order to effect such needle positioning control conventional sewing machine controlling circuitry is arranged to control the operating speed of the sewing machine with the speed being sufficiently reduced as is disclosed in Japanese Patent Provisional Publication No. 54-150243. However, when effecting such needle positioning control, the driving speed of the needle is set to a very low value so as to accurately position the needle at a predetermined resting position in which the needle is penetrating a piece of cloth to be sewed or is spaced apart from the cloth. Due to such a low moving speed of the needle, it takes a relatively long time period for a last stitch just before the needle is positioned at the predetermined resting position. Such a long time results in low efficiency of sewing operation. However, needle moving speed during positioning control cannot be simply set to a high value because high speed positioning control results in inaccurate positioning.

SUMMARY OF THE INVENTION

The present invention has been developed in order remove the above-described drawbacks inherent to the conventional speed control system for positioning the needle at a predetermined resting position.

It is, therefore, an object of the present invention to provide a new and useful circuit arrangement for speed control and needle positioning with which the needle is positioned at a predetermined resting position rapidly with high accuracy.

According to a feature of the present invention when a foot pedal used as a speed setting device is released to stop a sewing machine, speed setting data particularly provided for needle positioning is used to dampen the rotational speed of an arm shaft driving the needle. The particularly provided speed setting data is arranged such that the value thereof stepwisely reduces as the rotational angle of the arm shaft increases. Speed control is effected by using the stepwisely reducing data to stop the needle at the predetermined position. With this arrangement, the sewing machine operating speed is continuously lowered ensuring a relatively high speed even in needle position operation except for a very short period of time just before the needle stops.

In accordance with the present invention there is provided a circuit arrangement for controlling the operational speed of a sewing machine and for positioning a sewing needle at one or more predetermined resting position, comprising: first means for producing a signal indicative of the rotational speed of an arm shaft operatively connected to the sewing needle for driving the same; second means for producing a second signal when the sewing needle is at the predetermined resting position or positions; third means responsive to the first and second signals for producing a third signal indicative of the rotational angle of the arm shaft from a reference position; fourth means having a manually operable member for producing a fourth signal indicative of speed setting data in accordance with the user's choice, and a fifth signal when the manually operable member is positioned at a predetermined position; fifth means responsive to the third signal for producing a sixth signal indicative of speed setting data in such a manner that the greater the rotational angle, the smaller the speed setting data; sixth means for selecting the fourth signal in the absence of the fifth signal, and the sixth signal in the presence of the fifth signal; seventh means responsive to the first signal, second signal, fifth signal, and an output signal from the sixth means for producing a speed control signal; and eighth menas responsive to the speed control signal for controlling the rotational speed and damping operation of the arm shaft.

BRIEF DESCRIPTION OF THE DRAWINGS

The object and features of the present invention will become more readily apparent from the following detailed description of the preferred embodiments taken in conjunction with the accompanying drawings in which:

FIGS. 7A and 7B are flowcharts showing the operation of the microcomputer used a stop control unit of FIG. 2;

FIG. 8 is a time chart showing the needle positioning according to the present invention;

FIG. 10 is a table showing the relationship between the address and data of ROMs used in the second embodiment of FIG. 9;

The same or corresponding elements and parts are designated at like reference numerals throughout the drawings.

DETAILED DESCRIPTION OF THE INVENTION

Prior to describing the preferred embodiments of the present invention, the above-mentioned conventional circuit arrangement will be described with reference to a time chart of FIG. 1 for a better understanding of the present invention.

Although home-use sewing machines are usually constructed such that the needle thereof is driven by a motor whose rotational speed is variable, industrial-use sewing machines are usually arranged such that the needle is driven by a motor via a speed-control means usually comprising clutch and brake means. Although the present invention may be applicable to both such home-use and industrial-use sewing machines, the embodiment of the invention will be described in connection with industrial-use machines having clutch and brake means interposed between the electrical motor and a needle driving arm shaft.

Figure 1:
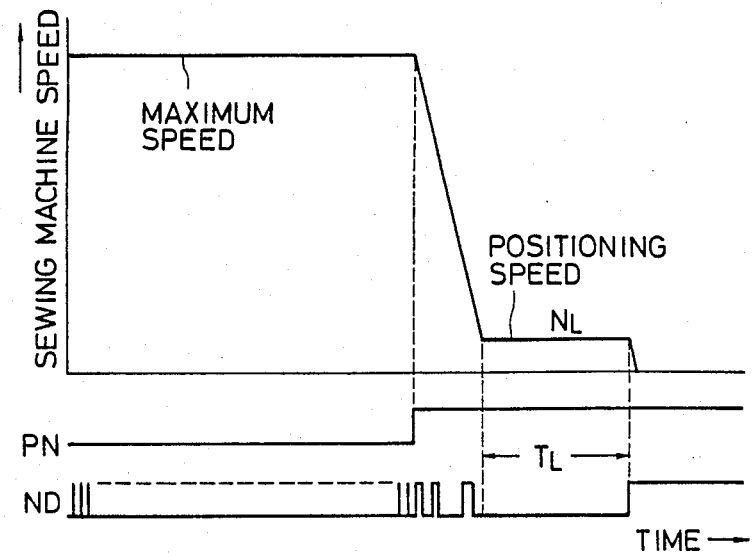
FIG. 1 is a time chart showing needle positioning in a known circuit arrangement.

FIG. 1 illustrates a time chart showing the rotational speed of an arm shaft operatively connected to a needle of a sewing machine for transmitting a driving force thereto from an electrical motor via a clutch and brake means. The curve of FIG. 1 indicates that the sewing machine speed lowers in order to position the needle at a predetermined resting position. The rotational speed of the arm shaft is controlled manually by means of a foot pedal or the like as well known. When a user operates such a conventional sewing machine, the foot pedal is depressed strongly or weakly to accelerate or decelerate the sewing speed and is released to interrupt sewing. When interruption occurs in response to the release of the foot pedal, the needle is positioned at a predetermined resting position. Usually two predetermined needle resting positions are provided, one being an uppermost position and the other being a lowermost position, and one of them may be manually selected. When the uppermost positon is selected, the needle stops at its most raised position so that an objective cloth is free from the needle. On the other hand when the lowermost position is selected, the needle stops at its most lowered position so that the needle is being penetrating the cloth.

As shown in FIG. 1, when the foot pedal is fully depressed the sewing machine operates at its maximum speed. When the foot pedal is released so that the pedal returns to its neutral position from the depressed position, the state of a signal PN indicative of the pedal position is changed from low level (L) to high level (H). In response to the change in the state of the signal PN the rotational speed of the arm shaft is lowered to a constant positioning speed $N_L$ used for positioning the needle at the above-mentioned predetermined resting position. After the speed is set to the positioning speed $N_L$, the arm shaft is completely stopped at an instant of detection of a needle position signal ND indicative of the predetermined resting position at which the needle is to be stopped.

In the above needle-positioning operation, a time length $T_L$ between an instant at which the speed has reached the positioning speed $N_L$ and an instant of detection of the needle position signal ND, requires an interval corresponding to one revolution of the arm shaft at the most. Namely, this time legth $T_L$ varies depending on the rotational angle of the arm shaft at which the positioning speed $N_L$ has been reached. However, since the positioning speed $N_L$ is of a relatively low value, the time length $T_L$ is apt to be very long causing the sewing operation to be troublesome and unefficient. Furthermore, since the time length $T_L$ varies as described in the above resulting in different positioning time for each interruption, sewing rhythm is easily disturbed resulting in unsmooth work.

Although it is theoretically possible to increase the positioning speed $N_L$ to reduce the positioning time, such speed increase results in inaccurate positioning, and is therefore nonpractical.

Figure 2:
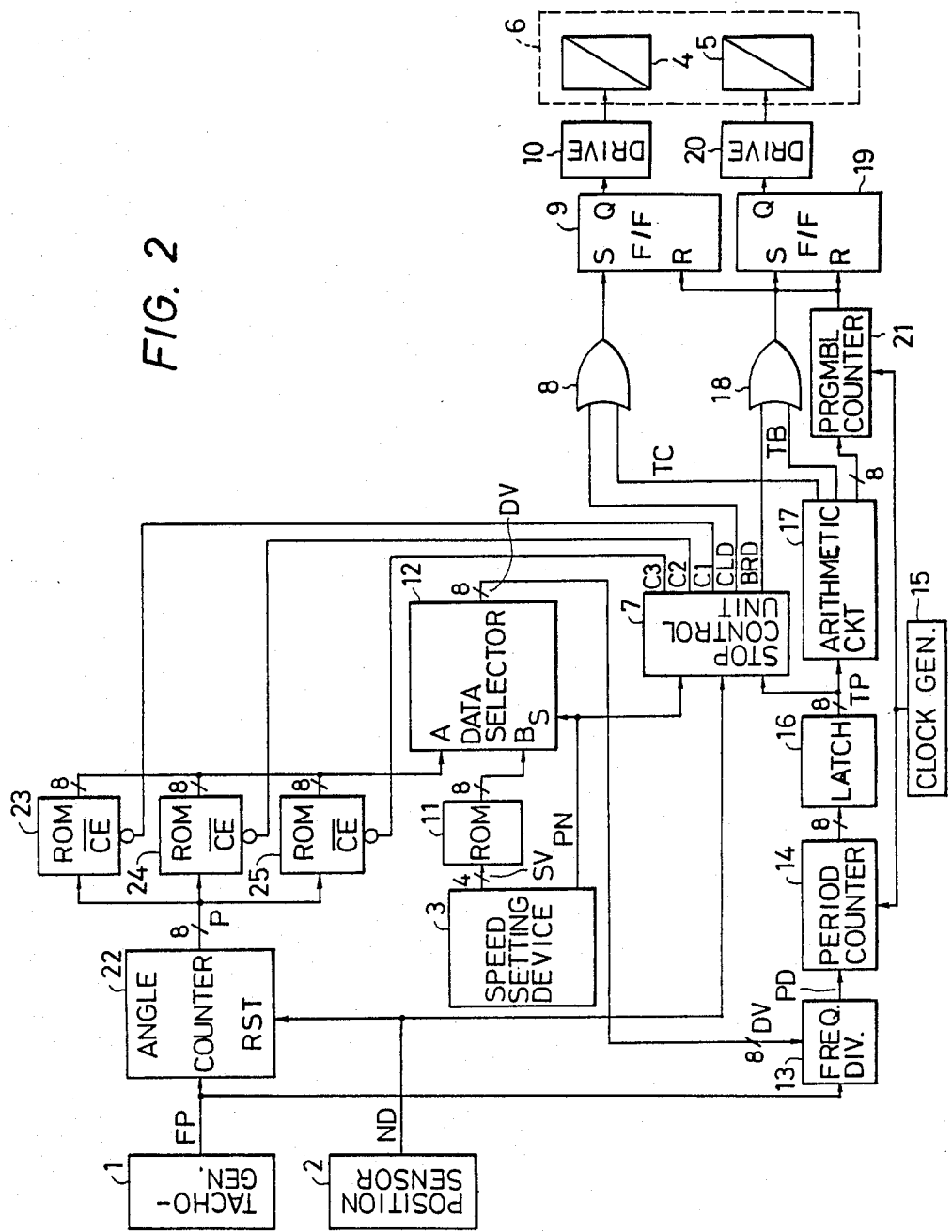
FIG. 2 is a schematic block diagram of a first embodiment of the present invention.

Reference is now made to FIG. 2 showing a schematic block diagram of a first embodiment of the present invention. The first embodiment circuit arrangement comprises a speed control device 6 interposed between a driving motor shaft (not shown) and an arm shaft (not shown) which is operatively connected to a sewing needle (not shown) in the same manner as in covnentional arrangements. In accordance with the present invention the speed control device 6 is controlled so as to change the rotational speed of the arm shaft in accordance with the degree of depression of a foot pedal and also to position the needle at a predetermined resting position when the foot pedal is fully released.

The circuit of FIG. 2 comprises a speed control system which is substantially the same as that disclosed in U.S. Pat. No. 4,377,778, for effecting normal speed control other than needle positioning. Namely, the circuit comprises a tachogenerator or frequency generator 1 arranged to produce a pulse signal FP indicative of the rotational speed of the arm shaft. In detail, the tachogenerator 1 is located close to one end of the arm shaft and produces a plurality of pulses per one revolution of the arm shaft. A needle-position sensor 2, such as a hall generator, photoelectric sensor or the like, is also located close to the end of the arm shaft in the same manner as the tachogenerator 1 to produce a needle-position signal ND when the needle is at its most raised position or most lowered position. A speed setting device 3 is associated with the foot pedal for detecting the state thereof. In detail the speed setting device 3 produces a neutral signal PN when the foot pedal is in fully released position, and a four-bit speed indicating signal SV in accordance with the depressing stroke of the foot pedal.

The above-mentioned speed control device 6 comprises a clutch and a brake which are both built in an output portion of the drive motor. The references 4 and 5 respectively denote a clutch coil and a brake coil of the clutch and brake. The motor is arranged to rotate at a predetermined speed and has a continuously rotating shaft which is linked via the lining of the clucth and other linking members, such as a pulley and a belt, to the arm shaft. Therefore, the rotational speed of the arm shaft can be controlled by the degree of the energization of the clutch coil 4. On the other hand, a brake lining of the brake is pressed toward a rotating member thereof on energization of the brake coil 5 so as to decelerate the arm shaft. With this arrangement variable speed control can be normally attained by controlling the energizing current to the clutch coil 4 and to the brake coil 5.

Remaining boxes in FIG. 2 are electronic circuits which may be replaced with integrated circuits, and these circuits will be described in connection their function. Assuming that the depression of the foot pedal is detected by the speed setting device 2, its output signal PN turns L from H. In response to the level change in the output signal PN, a stop control unit 7, which may be actualized by a microcomputer as will be described later, causes its output signal CLD to assume H level for a short period of time. As a result a pulse signal CLD is applied via an OR gate 8 to an S input of a flip-flop 9 to set the same. In response to setting state of the flip-flop 9 a driver 10 is turned on to energize the clutch coil 4 causing the arm shaft to start rotating. In other words, the rotational force from the motor starts being transmitted via the clutch to the arm shaft. The rotation of the arm shaft is converted into a reciprocal movement so that the sewing needle operatively connected to the arm shaft moves up and down.

The rotational speed of the arm shaft, which determines the sewing speed, is digitally controlled in the same manner as in known devices disclosed in U.S. Pat. No. 4,377,778. The way of speed control during normal operation, which control per se is known in the art, will be described with reference to FIGS. 2–5.

As the sewing machine starts operating as described in the above, the speed indicating signal SV is outputted from the speed setting device 3 in the form of four-bit data, to be applied as address data of a read-only memory (ROM) 11 in which speed setting data is prestored. This speed setting data indicates values of frequency-division ratios will be used for speed setting as will be described later. By designating a given address of the ROM 11, the speed indicating signal SV is converted into a speed setting value or data indicative of a frequency-division ratio, which is applied to an input terminal B of a data selector 12 having another input terminal A for receiving output data from three ROMs 23, 24 and 25. The data selector 12 is arranged to select one of two input signals at its input terminals A and B in accordance with the level of a switching signal applied to its S terminal. In detail when the switching signal is of L level, the input signal at the input B is outputted as the speed setting data DV which is set to a frequency divider 13 in turn.

The frequency divider 13 is responsive to the pulse signal from the tachogenerator 1 for dividing the frequency of the pulse signal by a number determined by the speed setting data DV, and outputs a frequency-divided pulse signal PD whose pulse width or period is measured by a period counter 14. Namely, the period counter 14 counts the number of clock pulses from a clock oscillator 15 for a time interval equal to one cycle of the frequency-divided signal PD. The count indicative of the time length of one cycle from the period counter 14 is temporarily stored in a latch 16, and is then outputted as eight-bit period data TP to an arithmetic circuit 17. The freqeuncy of the clock pulses is set to a value which is sufficiently higher than the frequency of the frequency-divided signal PD so as to reduce measuring error. With this arrangement in which sufficient resolution is ensured by a short pulse width, variation throughout the period of one pulse of the clock pulses does not undesirably affect the speed control system.

The arithmetic circuit 17 performs calculations as will be described later, and then produces an output signal when the period data TP is large, i.e. when the rotational speed of the arm shaft is low, to energize the clutch coil 4 via the OR gate 8, flip-flop 9 and driver 10. On the other hand, when the period data TP is small, i.e. when the rotational speed is high, another output is produced by the arithmetic circuit 17 to enegize the brake coil 5 via an OR gate 18, a flip-flop 19, and a driver 20. The energizing interval of the clutch coil 4 or the brake coil 5 is determined by counting the number of the above-mentioned clock pulses until the count reaches a value preset or programmed in a programmable counter 21 in accordance with the result of calculation effected by the arithmetic circuit 17. Namely, the result of calculation from the arithmetic cirucit 17 represents a time length, and therefore the programmable counter 21 produces a H level output signal when a programmed time has elapsed, which H level output is fed to R inputs of the flip-flops 9 and 10 to reset them respectively. As a result, the clutch coil 4 or the brake coil 5, which has been energized, is now deenergized.

In this way the output pulse signal from the tachogenerator 1 is used to control the energization of the clutch coil 4 and brake coil 5 so that measurement and control are successively effected with a feedback control.

Figure 3:
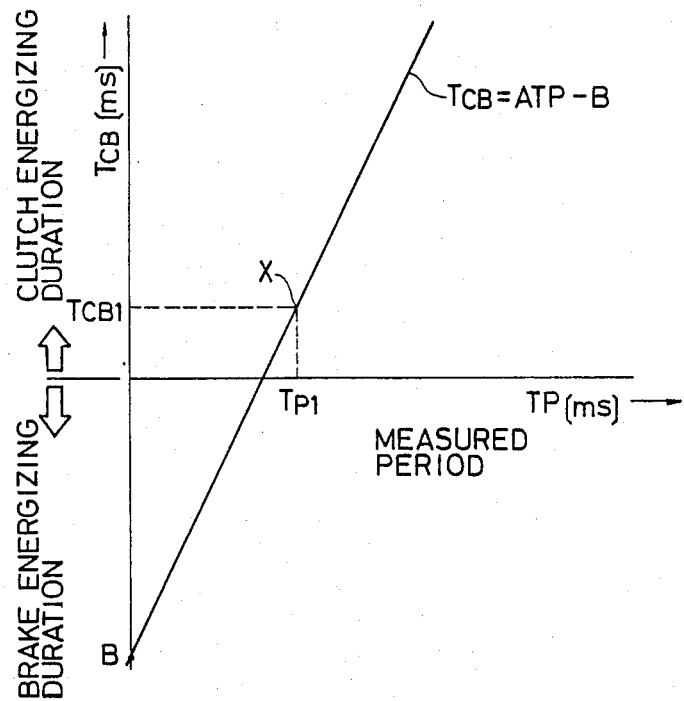
FIG. 3 is a graphical representation showing calculation in the arithmatic circuit of FIG. 2 used for determining clutch or brake energizing interval.

FIG. 3 shows a graphical representation of the calcuation effected by the arithmatic circuit 17. The calculation is effected according to the following formula:

$$T_{CB} = A T_P - B \quad (1)$$

wherein
$T_{CB}$ is the energizing duration of the clutch coil 4 or the brake coil 5;
A and B are constants; and
TP is a measured pulse interval.

In the above equation, the constant A is a value determining the varying rate of the clutch/brake energizing duration with respect to the measured pulse interval TP. Therefore, this constant A can be regarded as a value determining the gain of the speed control system, and is determined by taking account the stability and/or response of the speed control system. On the other hand, the other constant B determines the rotational speed of the arm shaft or the operating speed of the sewing needle, and is determined simply once the load of the sewing machine and a reference speed obtained when the frequency dividing ratio is 1 are both determined.

Figure 4A:
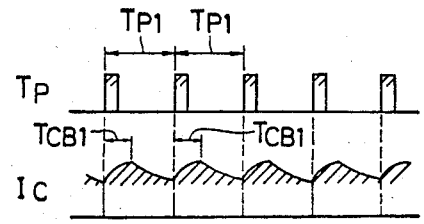
FIGS. 4A, 4B and 4C are time charts useful for understanding the speed control effected by the circuit arrangement of FIG. 2.
Figure 4B:
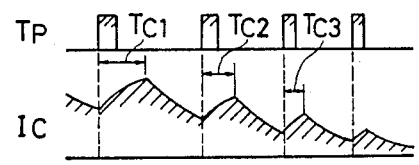

Assuming that the sewing machine operates stably at a point X on the curve of FIG. 3, a clutch current $I_C$ flows as shown in FIG. 4A via the clutch coil 4 where the clutch current $I_C$ is determined by a duty cycle $T_{CB1}$ in accordance with a period $T_{P1}$, and therefore the driving force applied to the needle and the sewing machine load are in equilibrium. FIG. 4B shows an accelerating condition. As the rotational speed of the arm shaft increases, the measured pulse period TP shortens, and therefore, the result of calculation according to equation (1) reduces as $T_{C1}$, $T_{C2}$, $T_{C3}$ as time goes, resulting in lower clutch current $I_C$, and this operation is repeated until the driving force equals the load of the sewing machine.

Figure 4C:
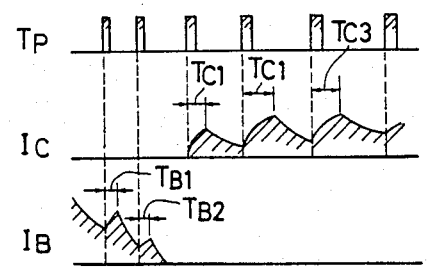

FIG. 4C shows a decelerating state in which the brake energizing interval reduces as $T_{B1}$, $T_{B2}$ as the measured pulse period TP increases. Furthermore, clutch energizing interval increases as $T_{C1}$, $T_{C2}$, $T_{C3}$. Namely, FIG. 4C shows a switching state in which brake current $I_B$ reducing state is changed to clutch current $I_C$ increasing state.

Although the above operation has been described under an assumption that the measured pulse period TP indicates the reference speed, when the measured pulse period TP is replaced with data derived by frequency-dividing the pulse signal from the tachogenerator 1 by a number n, a sewing machine operating speed, i.e. the rotational speed of the arm shaft, Ns is obtained as follows in the case that the gain of the speed control system is sufficiently high.

$$N_S = (n+1) N_L \quad (2)$$

wherein
n is the frequency dividing ratio; and $N_L$ is the reference speed.

Figure 5:
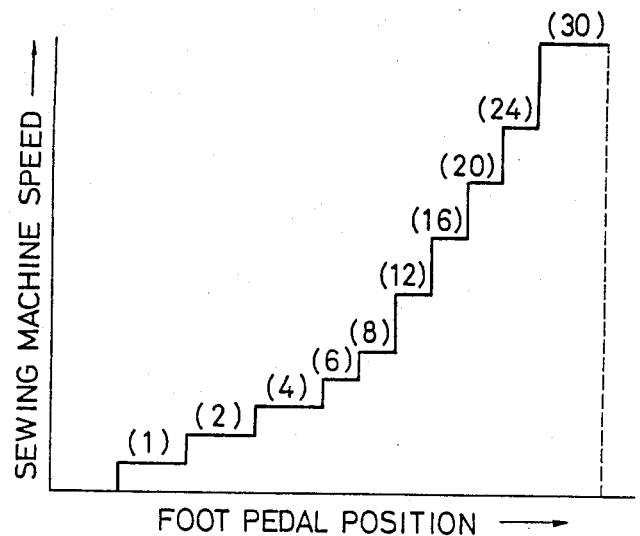
FIG. 5 is a diagram showing speed setting data prestored in the ROM responsive to the speed setting device of FIG. 2.

From the above, it will be understood that the operating speed of the sewing machine can be stepwisely controlled as shown in FIG. 5 with suitable values of the frequency dividing ratios n being assigned to respective ROM 11 addresses designated by the four-bit speed indicating signal SV. In FIG. 5, numerals in brackets represent the values used as the frequency dividing ratio n.

Now the operation of the circuit arrangement performed when the foot pedal is put in neutral position will be described. An angle counter 22 is provided to count the number of pulses FP from the tachogenerator 1. The angle counter 22 is periodically reset to zero by the output signal ND from the needle position sensor 2 each time the arm shaft turns once. The angle counter 22 is reset by a leading edge of the pulse of the needle position signal ND, which pulse is produced when the arm shaft assumes a predetemined reference angle at which the needle is in the predetermined resting position. Therefore, an output count P from the angle counter 22 represents the rotational angle of the arm shaft from a reference angular position. For instance, if a tachogenerator having 160 poles is used, the output count P indicates a rotational angle by way of eight-bit digital data expressing decimal numbers ranging from 0 through 160. The rotational angle data P is used to designate the addresses of three ROMs 23, 24 and 25 in which speed setting values or data in the form of frequency-dividing ratios have been assigned and prestored. Namely, the frequency-dividing ratios prestored in the ROMs 23–25 will be used in place of the first-mentioned frequency-dividing ratios from the ROM 11 by the frequency divider 13 for effecting needle positioning.

Figure 6:
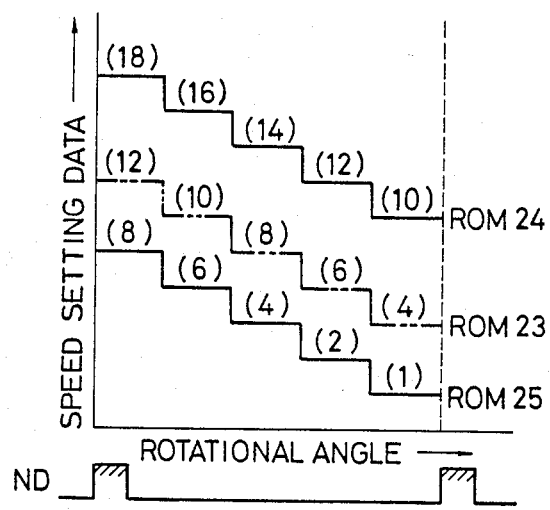
FIG. 6 is a diagram showing speed setting data respectively prestored in the ROMs responsive to arm shaft rotational angle data from the angle counter of FIG. 2.

FIG. 6 shows an example of assignment of speed setting data to the ROMs 23–25. As shown a full turn of the arm shaft throughout 360 degrees is divided into five ranges each having 72 degrees, and five different speed setting values are provided for each of the ROMs 23–25. Namely, five data are respectively stored in different addresses of each ROM. The numerals shown in brackets are these speed setting values or frequency-dividing ratios prestored in the ROMs 23–25. In detail, values 12 through 4 are stored in the ROM 23, values 18 through 10 in the ROM 24, and values 8 through 1 in the ROM 25 in such a manner that the maximum speed setting data is selected immediately after a leading edge of the needle position signal pulse ND appears and the minimum speed setting data is selected just before the leading edge where five speeds are provided for each of the ROMs 23–25. In other words, the smaller the rotational angle of the arm shaft from the reference position, the higher the speed setting data.

Turning back to FIG. 2, when the foot pedal is fully released to be in neutral position after high-speed operation, the speed setting device 3 detects the neutral position of the foot pedal to change the level of its output signal PN from L to H. The H level signal PN from the speed setting device 3 is fed to the S terminal of the data selector 12 as the above-mentioned switching signal so as to select input data supplied to its A input. Furthermore, the H level signal PN is also applied to the stop control unit 7 commanding the start of needle positioning control.

The stop control unit 7 comprises a microcomputer having a central processing unit (CPU), a read-only memory (ROM), a random-access memory (RAM), and an input-output device (I/O) in the same manner as ordinary microcomputers. The operation of the microcomputer used as the stop control unit 7 will be described with reference to FIGS. 7A and 7B showing flowcharts.

FIG. 7A is a flowchart of a main routine program executed by the microcomputer. In a step 100, it is determined whether the foot pedal is in neutral position or not by detecting the level of the signal PN from the speed setting device 3. If the signal PN is of L level, i.e. if the foot pedal is in depressed state, steps 102 and 104 are successively executed in which various flags and outputs C1, C2 and C3 are initialized or reset to 0 (L level). These outputs C1–C3 are respectively applied to the ROMs 23–25 as chip-enabling signals for selecting one of them at one time.

When the foot pedal is fully released, the determination in the step 100 results in YES to execute a step 106 in which it is determined whether a flag FLN2 has been set. Since the flag FLN2 has been reset, the main routine is terminated.

Figure 7B:
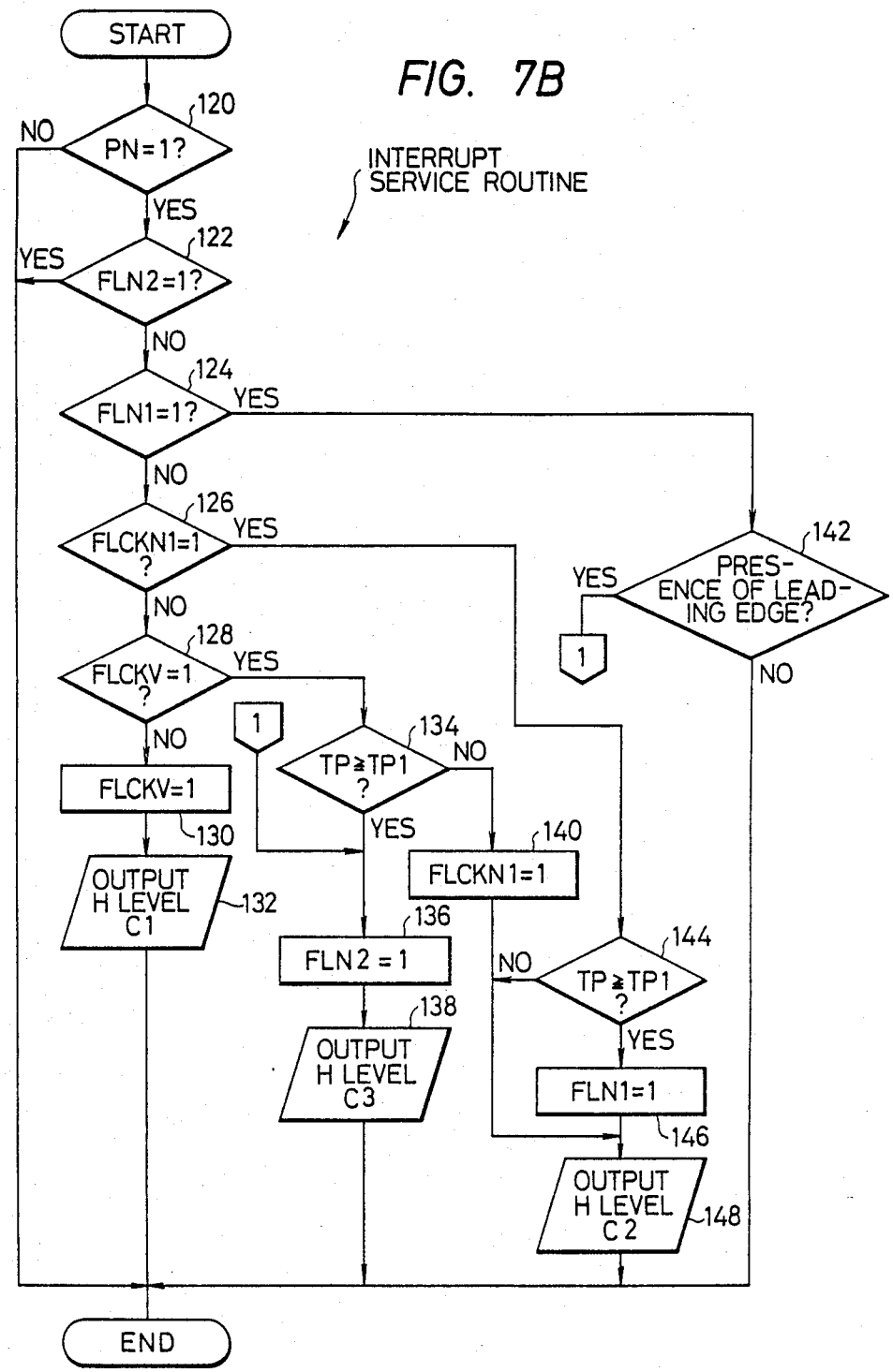

During the execution of the main routine, in the presence of the above-mentioned frequency-divided pulse signal indicative of the above-mentioned period data TP, the main routine is interruputed to execute an interrupt service routine of FIG. 7B. At the beginning of the interrupt service routine, a step 120 which is substantially the same as the step 100 is executed to detect the presence of the signal PN of L level from the speed setting device 3. When such a low level signal PN is detected, a step 122 is executed to determine whether a flag FLN2 has been set. Since the flag FLN2 has been initialized in the step 102 as described in the above, the determination in the step 122 results in NO to execute a step 124 in which it is determined whether the flag FLN1 has been set. Since the flag FLN1 has also been initialized in the step 102 as described in the above, the determination in the step 124 results in NO to execute a step 126 in which it is determined whether a flag FLCKN1 has been set. In this way determination in the step 126 and the following step 128 result in both NO to execute a step 130 in which the flag FLCKV is set. Then in a step 132 the output C1 of H level is produced and sent to a chip-enable (CE) terminal of the ROM 23. Data prestored in the ROM 23 is selected by designating an address as described in the above, and the selected data, i.e. a speed setting value, is fed via the data selector 12 to the frequency divider 13 as the above-mentioned frequency-dividing ratio data DV. Therefore, the pulse signal from the tachogenerator 1 is frequency-divided by the speed setting value so that new period indicating data TP is obtained at the output of the latch 16 in the same manner as described in the above. This period data TP is applied to the microcomputer 7 for next cycle operation. The period data TP measured in this way is checked if it is equal to or greater than a predetermined value indicative of a reference period $T_{P1}$. Namely, the checking is effected by determining whether the measured speed is equal to or greater than a speed indicated by a two-dot-dash line of FIG. 6. If the measured speed is higher than the reference speed represented by the period $T_{P1}$, namely if $TP \geq T_{P1}$, the determination in a step 134 will result in NO, and therefore, a flag FLCKN1 is set in a following step 140, and then an output C2 of H level is produced in a step 148.

Therefore, the ROM 24 is selected to output speed setting values 9 through 5 which are used as the frequency dividing ratio in the frequency divider 13 to reduce the rotational speed of the arm shaft. When the operational flow comes to the step 126 again, the determination therein results in YES since the flag FLCKN1 has been set in the step 140. Thus, a step 144 is executed to see if TP≧TP1 in the same manner as in the step 134. The step 144 and the following step 148 are repeatedly executed until the measured period TP equals or exceeds the reference period TP1. When TP equals or exceeds the reference period TP1, a step 146 is executed to set the flag FLN1. Namely, when the rotational speed of the arm shaft becomes equal to or below a speed setting, the flag FLN1 is set. As a result, the determination in the step 124 in a subsequent cycle results in YES to execute a step 142 in which the presence of the leading edge of the needle position signal pulse ND is detected. The determination in the step 142 results in YES in the presence of the leading edge to execute the steps 136 and 138 to set the flag FLN2 and produce a H level output signal C3. In response to the H level C3 output from the mircocomputer 7 the ROM 25 is enabled to read out speed setting data therefrom. Therefore, the rotational speed of the arm shaft is further reduced in accordance with the stepwisely lowering set speeds to stop the needle at the predetermined resting position.

As the above operation is continuously executed, the speed setting value in the form of a frequency dividing ratio of 1 prestored in the ROM 25 (see FIG. 6) is finally selected so that the arm shaft driving the sewing needle rotates at the lowest speed. When a leading edge of the needle position signal pulse ND is detected, in the step 108 of the main routine, an output signal BRD is sent via the OR gate 18 to the flip-flop 19 to set the same in a step 110. As a result, the brake coil 5 is energized for an interval necessary for completely stopping the arm shaft and therefore the sewing needle at the predetermined resting position. In this way, needle positioning operation is completed.

Summarizing the needle positioning operation effected for stopping the needle at the predetermined resting position when the sewing machine operates at a high speed, speed setting is repeatedly effected in accordance with speed setting data from the ROM 24, and when the arm shaft rotating speed becomes lower than the set speed, sequential speed control is started by using the speed setting data prestored in the ROM 25. Namely, when the leading edge of the needle position signal ND is detected, the ROM 25 is enabled to successively lower the set speed in accordance with the rotational angle of the arm shaft in such a manner that the speed setting data in the form of a frequency dividing ratio equals 1 just before a subsequent leading edge is detected to stop the needle at the predetermiend resting position in response to the subsequent leading edge.

Although the above operation has been described that speed control is effected in accordance with speed setting data from the ROM 24 before the lower speed control according to the speed setting data from the ROM 25, if the measured speed is lower than the set speed prestored in the ROM 23, speed control according to speed setting data from the ROM 24 is skipped and therefore, speed control according to speed setting data from the ROM 25 is directly effected.

FIG. 8 shows a timechart showing the needle positioning operation described in the above. Assuming that the sewing machine operates at a high speed before time t1 at which the foot pedal is suddenly released fully, the measured speed indicated by the period TP is higher than the speed setting data from the ROM 23. Therefore, speed control is reapeatedly effected in accordance with the speed setting data from the ROM 24 until the measured speed equals the setting speed at point P1 (see time t2). During this speed control according to speed setting data from the ROM 24, the brake coil 5 is fully energized so that the arm shaft is decelerated at the maximum slope or negative acceleration. After the arm shaft speed reaches the point P1 of FIG. 8, the above-mentioned sequential speed control is effected in accordance with a braking or damping slope defined by the stepwisely reducing speed setting data from the ROM 25. As a result, the arm shaft rotational speed further decreases to cause the needle to stop at the predetemined resting position. Although the speed control is effected in accordance with speed setting data from ROMs 24 and 25, the number of such ROMs may be increased so that further presice control at high speeds may be possible.

Although the speed control during positioning is effected in accordance with speed setting data read out from the ROMs 24 and 25 in the above embodiment, it is possible to increase the number of ROMs so as to differently control the arm shaft speed before the speed reaches the point P1 of FIG. 8. However, it is not advantageous to use a gentle slope damping curve during relatively high speed operation because such a gentle slope results in increase in time length required for needle positioning. Therefore, if speed control according to the stepwisely reducing speed setting values from the ROM 25 is effected for the last one or two stitches sewed just before the sewing machine stops as shown in FIG. 8, the needle stops at the predetermined resting position with less time, allowing the object of the speed control with high efficiency.

A time length $T_E$ required for sewing one stitch just before the needle positioning or stopping, may be changed by varying the slope of the braking curve at the last one revolution of the arm shaft, where such slope change may be effected by suitably selecting the values of the set speeds to be prestored in the ROM 25. However, it is to be noted that the maximum braking curve slope is limited by an actual braking curve slope obtained on full enegization of the brake coil 5.

The position at which the needle is actually stopped has a chance to vary or fluctuate due to various factors, such as variation in braking force, variation in friction by brake lining, variation in voltage applied to the brake coil or the like. However, variation in stopping position may be reduced by setting the lowest set speed $N_L$ used just before the needle stops. To this end, the constant B in equation (1) may be made larger after the foot pedal is put in neutral position so that the lowest set speed $N_L$ is sufficiently low reducing the variation range in the needle stopping position.

In the embodiment of FIG. 2, although only the stop control unit 7 has been described as comprising a microcomputer, most of the circuits in FIG. 2, i.e. the angle counter 22, the ROMs 23-25, the data selector 12, and a combination of the OR gates 8, 18, the flip-flops 9, 19, the ROM 11, the frequency divider 13, the period counter 14, the latch 16, the clock pulse generator 15, the arithmatic circuit 17, the stop control unit 7, and the programmable counter 21 may be actualized by a single chip microcomputer since digital operation is effected.

Figure 9:
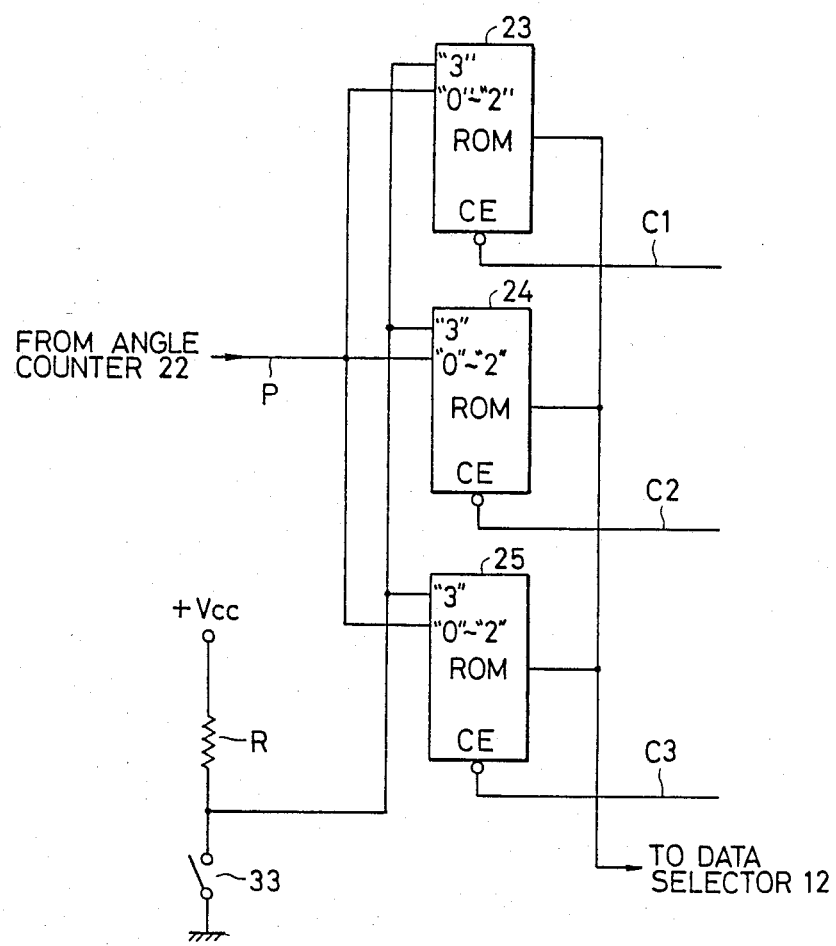
FIG. 9 is a partial diagram of a second embodiment of the present invention.

Reference is now made to FIG. 9 showing another embodiment of the present invention. This embodiment differs from the above-described first embodiment in that two sets of speed setting data are stored in each of the ROMs 23-25 to be selectively read out in accordance with a signal produced by a manual switch 33. Since remaining parts are the same as in the first embodiment of FIG. 2, FIG. 9 shows only the ROMs 23-25, and the above-mentioned switch 33. Although the rotational angle data P from the counter 22 is of eight-bit, only three upper bits are used to express decimal numbers 0 through 5. Namely, three-bit signal lines are respectively connected to address pins "0", "1", "2" of each of the ROMs 23-25. The above-mentioned manually operable switch is interposed between ground and a resistor R connected to a power source +Vcc. The resistor R is also connected to another address pin "3" of each of the ROMs 23-25. With this arrangement four-bits defining each address of the ROMs 23-25 is determined by the three upper bits of the needle position data P from the angle counter 22 and by one bit from the resistor R.

Figure 11A:
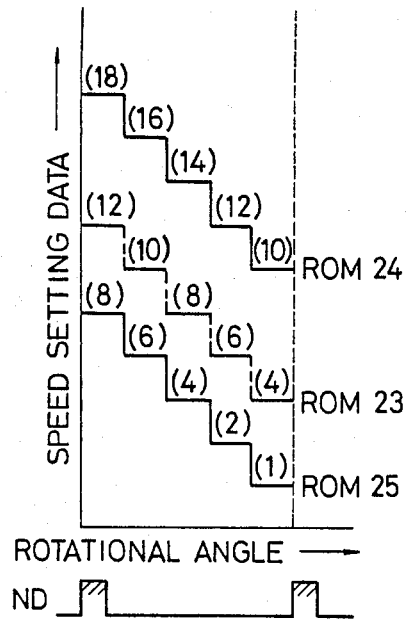
FIGS. 11A and 11B are diagrams showing the data of the ROMs in the second embodiment with respect to the rotational angle of the arm shaft.
Figure 11B:
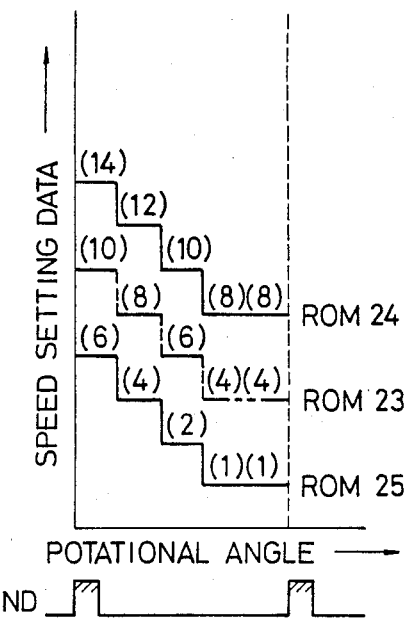

FIG. 10 and FIGS. 11A and 11B show the way of assignment of data to the ROMs 23-25. As shown in the table of FIG. 10 and diagrams of FIGS. 11A and 11B, five pieces of data are provided with respect to the rotational angle data P so that one of them will be selected. FIG. 11A shows the first set of speed setting data which are used when the switch 33 is turned on, while FIG. 11B shows the second set of speed setting data which are used when the switch 33 is turned off. The speed setting data prestored in the ROMs 23-25 is arranged such that the data value is maximum when the rotational angle is minimum, and the data value is minimum when the rotational angle is maximum in the same manner as in the first embodiment.

The second embodiment of FIGS. 9-11B operates as follows. Since the damping curve slope can be switched and selected by the switch 33 as will be understood from the comparison between FIGS. 11A and 11B, the time length required for the last one stitch $T_E$ shown in FIG. 8 can be changed. In other words, the operator or user of the sewing machine can select either a quick positioning or a slow positioning. Although this embodiment offers only two stepwisely reducing positioning speeds, the number of positioning speeds may be increased by providing a further number of setting speed values which can be manually selected by a like switch. With this arrangement, the damping curve slope can be freely selected to the user's choice or preference. However, it is apparant that the maximum damping curve slope is limited by the actual damping slope obtained when the brake coil 5 is fully energized as described hereinabove.

Figure 12:
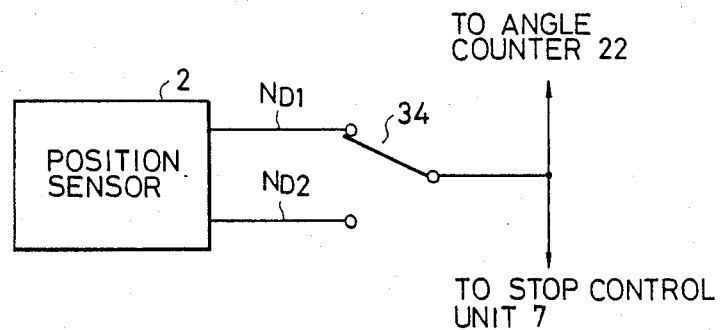
FIG. 12 is a partial diagram of a third embodiment of the present invention.

FIG. 12 shows another embodiment of the present invention, which embodiment differs from the above-described embodiments in that one of two output signals both indicating different needle positions may be manually selected by a manually operable switch 34. As described at the beginning of this specification, the sewing needle is stopped at a predetermined resting position corresponding to the most raised point or most lowered point. Since it is desirable that the needle can be stopped at either upper or lower point in accordance with the user's choice, the switch 34 is provided to select one of these two resting positions. Namely, the needle position sensor 2 is arranged to produce two different output signals $N_{D1}$ and $N_{D2}$ respectively indicating the uppermost position and the lowermost position. By manually selecting one of these two output signals, the needle stops at the selected position.

The above-described embodiments are just examples of the present invention, and therefore, it will be apparent for those skilled in the art that many modifications and variations may be made without departing from the spirit of the present invention.

What is claimed is:

1. A circuit arrangement for controlling the operational speed of a sewing machine and for positioning a sewing needle at one or more predetermined resting position, comprising:
   (a) first means for producing a first signal indicative of the rotational speed of an arm shaft operatively connected to said sewing needle for driving the same;
   (b) second means for producing a second signal when said sewing needle is at said predetermined resting position or positions;
   (c) third means responsive to said first and second signals for producing a third signal indicative of the rotational angle of said arm shaft from a reference position;
   (d) fourth means having a manually operable member for producing a fourth signal indicative of first speed setting data in accordance with the user's choice, and a fifth signal when said manually operable member is positioned at a predetermined position;
   (e) fifth means responsive to said third signal for producing a sixth signal indicative of second speed setting data in such a manner that the greater the rotational angle, the smaller the second speed setting data;
   (f) sixth means for selecting said fourth signal in the absence of said fifth signal, and said sixth signal in the presence of said fifth signal;
   (g) seventh means responsive to said first signal, second signal, fifth signal, and an output signal from said sixth means for producing a speed control signal; and
   (h) eighth means responsive to said speed control signal for controlling the rotational speed and damping operation of said arm shaft.

2. A circuit arrangement as claimed in claim 1, wherein said seventh means comprises:
   (a) a frequency divider responsive to a pulse signal from said first signal for frequency-dividing the same by a value determined by the output signal from said sixth means;
   (b) a clock pulse generator;
   (c) a counter for counting the number of clock pulses from said clock pulse generator for a time length defined by an output pulse signal from said frequency divider;
   (d) an arithmetic circuit responsive to an output signal from said counter for causing said eighth means to accelerate and decelerate the rotational speed of said arm shaft; and
   (e) a microcomputer responsive to the output signal from said counter, said second signal, and to said fifth siganl for causing said eighth means to decelerate the rotational speed of said arm shaft so as to stop said sewing needle at said predetermined resting position.

3. A circuit arrangement as claimed in claim 2, wherein said fifth means comprises memories in which said speed setting data is prestored in such a manner that a plurality of speed setting data having different values for the same rotational angle of said arm shaft are stored to be selectively read out in accordance with the output signal from said counter.

4. A circuit arrangement as claimed in claim 3, wherein said microcomputer is arranged to enable one of said memories in accordance with said output signal from said counter by comparing the value represented by said output signal with a predetermined value.

5. A circuit arrangement as claimed in claim 4, wherein said memories comprise a plurality of read-only memories.

6. A circuit arrnagement as claimed in claim 1, wherein said third means comprises a counter arranged to count the number of pulses included in said first signal for a time length defined by said second signal.

7. A circuit arrangement as claimed in claim 6, wherein the count of said counter is used to designate an address of memories used as said fifth means.

8. A circuit arrangement as claimed in claim 1, further comprising a manually operable switch for selecting one of a plurality of sets of speed setting data from said fifth means, wherein said plurality of sets of speed setting data have different damping curve slopes.

9. A circuit arrangement as claimed in claim 8, wherein said fifth means comprises memories whose addresses are designated by a plurality of bits of said third signal, and one or more bits from said manually operable switch.

10. A circuit arrangement as claimed in claim 1, wherein said second means is arranged to produce two of said second signal respectively when said sewing needle is at its uppermost position and at its lowermost position, said circuit arrangement further comprising a manually operable switch for selecting one of said two second signals so that said sewing needle is positioned at either said uppermost position or lowermost position.

11. A circuit arrangement as claimed in claim 1, wherein said eighth means comprises a clutch and brake device interposed between an electrical motor used as the prime mover of said sewing machine and said arm shaft.

12. A circuit arrangement as claimed in claim 1, wherein a single chip microcomputer is used as a combination of said third, fifth, sixth and seventh means.

* * * * *